United States Patent [19]

Wood

[11] 4,172,655

[45] Oct. 30, 1979

[54] SHINGLE SHEET STACKING FOR DUPLEX COPYING

[75] Inventor: Larry M. Wood, Penfield, N.Y.

[73] Assignee: Xerox Corporation, Stamford, Conn.

[21] Appl. No.: 919,199

[22] Filed: Jun. 26, 1978

[51] Int. Cl.$^2$ ...................... B65H 29/68; G03B 27/32

[52] U.S. Cl. ........................................ 355/26; 271/69

[58] Field of Search ................ 355/3 SH, 3 R, 72, 75, 355/14, 23, 24, 25, 26; 271/69, 3.1

[56] References Cited

U.S. PATENT DOCUMENTS

| | | | |
|---|---|---|---|
| 2,863,663 | 12/1958 | Richards | 271/69 |
| 3,615,129 | 10/1971 | Drawe et al. | 355/3 R |
| 3,630,607 | 12/1971 | Korn et al. | 355/14 X |
| 3,776,544 | 12/1973 | Watson et al. | 271/3 |
| 3,999,852 | 12/1976 | Katayama et al. | 355/26 |
| 4,050,805 | 9/1977 | Hage | 355/24 X |
| 4,080,060 | 3/1978 | Nothmann | 355/23 |
| 4,089,516 | 5/1978 | Colglazier et al. | 271/69 X |
| 4,093,372 | 6/1978 | Guenther | 355/50 |

*Primary Examiner*—Donald A. Griffin

*Attorney, Agent, or Firm*—William A. Henry

[57] ABSTRACT

A duplex copying system including an improved buffer set means that receives substrates having been copied on a first side and shingles the substrates for subsequent refeeding and copying on a second side.

7 Claims, 3 Drawing Figures

SHINGLE SHEET STACKING FOR DUPLEX COPYING

SUMMARY AND BACKGROUND OF THE INVENTION

This invention relates to paper handling systems, and more particularly, to a duplex copying system which employs a buffer set means for duplexing.

Duplex copying systems that employed buffer sets of storage means in the past have used a set-stacker, bottom retard feeder and duplex return transport means to achieve the duplex function.

Bottom sheet feed devices have been employed as duplex buffer trays in the past that included pressurized air to reduce friction between the bottom sheet and the sheet stack tray and minimize friction between the bottom sheet and sheets immediately adjacent thereto. In order to prevent mis-feeds, a tri-roller feed belt has been employed having two stationary rolls and a movable roll, the stationary roll disposed beneath the edge of the sheet stack serving to support the feed belt against the lower sheet for feeding the sheet from the stack, the movable roller being disposed adjacent the aforesaid stationary roller for movement into engagement with the bottom sheet of the stack in the event that a sheet is not forwarded at the proper time under the influence of the belt section above the stationary roller. The displacement of the movable roller increases the surface area of the belt in contact with the bottom sheet of the stack to exert a greater feed force thereon.

Problems encountered during the use of such systems included some mis-feeding of sheets which reduced reliability of the systems, and the cost of the buffer feeders for duplex was significant in that stack separators were used with retard feeder mechanisms in addition to numerous other devices in order to make the systems work.

The present invention is intended to overcome the above-mentioned disadvantages and comprises a duplex buffer set means for temporarily storing a set of one-sided copies that are to be subsequently refed from the buffer set means for second sided copying. The buffer set means includes receiving means for receiving sheets with images on one side thereof from a copy processor and for stacking the one-sided sheets in a stacking means. Means are also included for forwarding the sheets out of the stacking means back to the copy processing means for images to be placed on the other side of the sheets. The forwarding means includes shingling means for indexing each sheet out of the stacking means by a predetermined amount coordinated with the arrival of each incoming sheet in said receiving means to form a buffer set of one-sided sheets with each sheet in the set offset from the other sheets by said predetermined amount.

PRIOR ART STATEMENT

Various prior art structures are known for providing the shingled output of copies or sets of copies. For example, U.S. Pat. No. 2,863,663, to A. J. Richards, issued Dec. 9, 1958. U.S. Pat. No. 3,776,544, issued Dec. 8, 1973 to D. W. Watson on an automatic loading apparatus states that gates 48 serve to rearrange stacked articles carried by conveyor 38 into shingled or overlapping relationship. The lateral off-setting of entire output sets of pre-collated copies, i.e., in a staggered set stack, is shown in U.S. Pat. No. 3,630,607 to H. Korn et al., issued Dec. 28, 1971. U.S. Pat. No. 4,093,372, issued June 6, 1978, to J. Guenther discloses an automatic document handling system for repeatedly recirculating a set of individual documents passed the imaging station of a copier in a pre-collated order to make multiple pre-collated copy sets therefrom. In this system, each individual document is maintained partially separated from the others in the set during their copying recirculation by shingling all of the documents in a partially separated, partially overlapping, configuration during a portion of the recirculation.

An exemplary embodiment of the present invention is shown and described herein below as incorporated into an otherwise conventional exemplary xerographic apparatus and process. Accordingly, said xerographic apparatus and process itself need not be described in detail herein since various publications, patents, and known apparatus are available to teach details thereof to those skilled in the art.

BRIEF DESCRIPTION OF THE DRAWINGS

Further objects, features and advantages of the present invention pertaining to the particular apparatus, steps and details whereby the above-mentioned aspects of the invention are attained will be included below. Accordingly, the invention will be better understood by reference to the following description and to the drawings forming a part thereof.

DESCRIPTION OF PREFERRED EMBODIMENT

Figure 1:
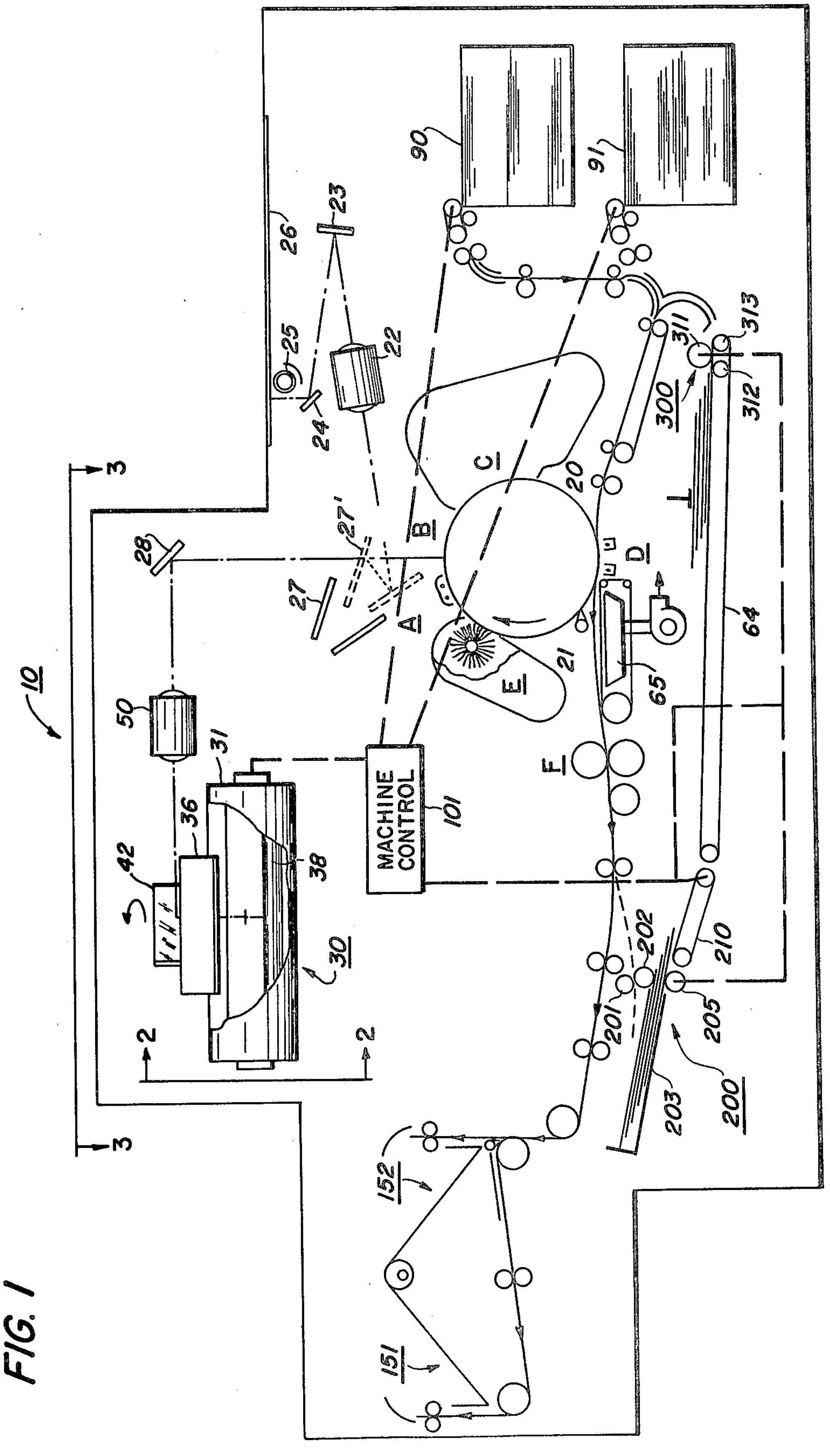
FIG. 1 is a side view of a bidirectional xerographic copying system with collated copy sheet output in accordance with the present invention.

Referring to FIG. 1, there is shown a schematic illustration of a exemplary reproduction machine 10 that employs a buffer set tray means that will accomplish the objectives of the present invention. It includes a conventional photoconductive layer or light sensitive surface 21 on a conductive backing and formed in the shape of a drum which is mounted on a shaft journaled in a frame to rotate in the direction indicated by the arrow to cause the drum surface to pass sequentially a plurality of xerographic process stations. It should be understood that belt photoreceptor and flash exposure could be used instead of the photoreceptor and exposure means shown in FIG. 1.

For purposes of the present disclosure, the several generally conventional xerographic processing stations in the path of movement of the drum surface may be described functionally as follows:

a charging station A at which the photoconductive layer of the xerographic drum is uniformly charged;

an exposure station B at which a light or radiation pattern of a document could be reproduced is projected onto the drum surface to dissipate the drum charges in the exposed areas thereof, thereby forming the latent electrostatic image of a copy to be reproduced;

a developing station C where xerographic developers are applied to the photoconductive surface of the drum to render the latent image visible;

a transfer station D at which the xerographic developer image is electrostatically transferred from the drum surface to a transfer support material;

a drum cleaning station E at which the drum surface is brushed to remove residual toner particles remaining thereon after image transfer; and a fusing station F at which point the image is fused to the copy paper or support material.

For copying, the xerographic apparatus 10 disclosed herein projects an image from the automatic web scroll document handling apparatus 30 described in U.S. Pat. No. 3,963,345, issued to D. Stemmle and M. Silverberg, which disclosure is incorporated herein by reference.

The document images are projected through lens 50 down from mirror 28 of FIG. 1 onto the photoreceptor 20. The image is developed on the photoreceptor surface 21 and rotated clockwise to a transfer station D. Copy sheets coming from either the main copy sheet feeding tray 90 or the auxiliary sheet feeding tray 91 are fed by a series of sheet feeding rollers to the transfer station D in order to accept the developed image from the photoreceptor drum 20 at the transfer station D. Vacuum stripping means 65 strips the paper from the photoreceptor 20 and transports it toward fuser F so that the image can be fused onto the copy sheet. Thereafter, the copy sheet is transported either to duplex tray 200 or to an output sheet tray 151 or 152. For simplex copies, the duplex tray 200 is not utilized. Documents can be imaged in the apparatus of FIG. 1 either from the automatic document handler or from platen 26.

For uni-directional document copying, all of the sets will be in one output tray. The same output tray 151 is used whether the copies are simplex or duplex. Collation occurs without an inverter. For bi-directional copying, alternate sets are ultimately placed in trays 151 and 152. The forward order copies go into tray 151, and the reverse order copies go into tray 152.

Figure 2:
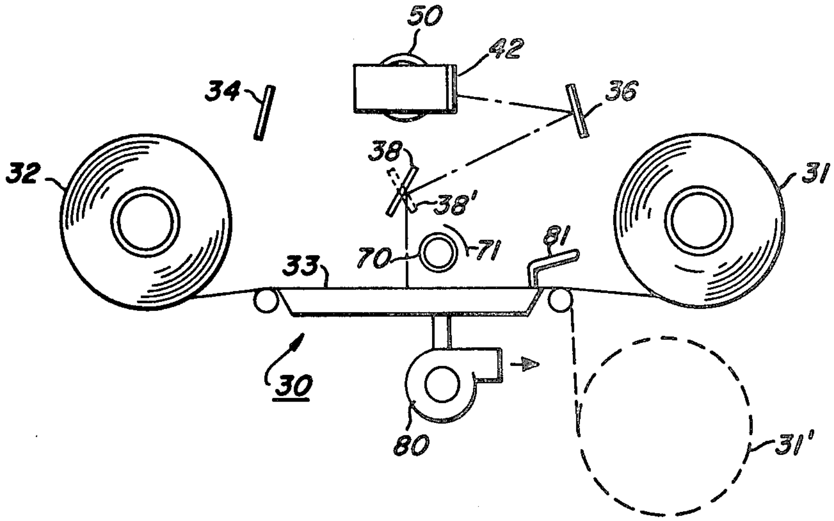
FIG. 2 is a side view taken along line 2—2 of the automatic document handling apparatus shown partly cut away in FIG. 1.

As shown in FIG. 2, documents are loaded by being placed onto web 33 against registration means 81 while scroll 31' is in the load/unload position. As the documents are moved by the automatic document handler (hereinafter called ADH), they are exposed to light directly from exposure lamp means 70 and reflected through reflector means 71 off the document into a bi-directional optical system for projection of the document image onto photoreceptor 20. Each sheet is conveyed passed exposure means 70 and reflector means 71 and wound onto scroll means 32 after scroll means 31 has been moved into recirculation position. Subsequently, scroll means 32 is reversed in direction toward scroll means 31 to allow re-exposure of documents wound around in a reverse scan mode.

For the first exposure of the documents on page images on the web, only even numbered documents are imaged, i.e. documents located in the 2, 4, 6, 8, etc. positions on web 33. Depending on whether uni-directional or bi-directional copying is desired, the buffer set is a one-set or two-set buffer, respectively. For uni-directional copying, a fast reverse rewind is accomplished and only one buffer set is required. For bi-directional copying, the even numbered documents are also imaged during reverse movement of the web to create two-buffer sets, one in ascending order (2, 4, 6 . . . ) and one in descending order (8, 6, 4, 2). In either case, copies made from exposure of the even numbered documents are fused at station F and continued in transportation on a conventional conveyor system into buffer tray means 200.

It is within the buffer tray area 200 that the present invention resides in that documents in the document handler are imaged, even numbered documents first on a forward pass of the document handler (hereinafter referred to as ADH) with the images obtained from the documents being transferred to copy sheets fed from copy sheet tray 90. After the images have been transferred at station D, the one-side imaged sheets are then forwarded toward buffer set means 200. In route to the buffer set means 200, the copy sheets are first forwarded by receiving means 201 and 202 into stacking means 203. After the first sheet has been deposited into duplex buffer means 200, as each additional sheet is forwarded into stacking means 203, the latter sheets are indexed a predetermined amount by shingling means 205 so as to separate each additional incoming sheet into the buffer means a predertmined amount for subsequent refeeding to transfer station D in order to have second side images placed thereon.

Shingling means 205 causes a set of one-sided copy sheets to be presented to conveyor transport means 210 in an offset, stair-stepped fashion such that the offset is about ½ inch. After a complete set of one-sided copies has been shingled by shingle means 205, conveyor transport means 210 moves the completed set at a high rate of speed onto a second conveyor means 64 which is adaptable to also move the completed set at a high rate of speed to refeeding means 300 for subsequent refeeding of the sheets for second-side copying. Refeeding means 300 includes a feeding roller 311 and separating rollers 312 and 313 that work in conjunction to forward the sheets back to transfer station D in order to receive images on the second side of the copy sheets.

Figure 3:
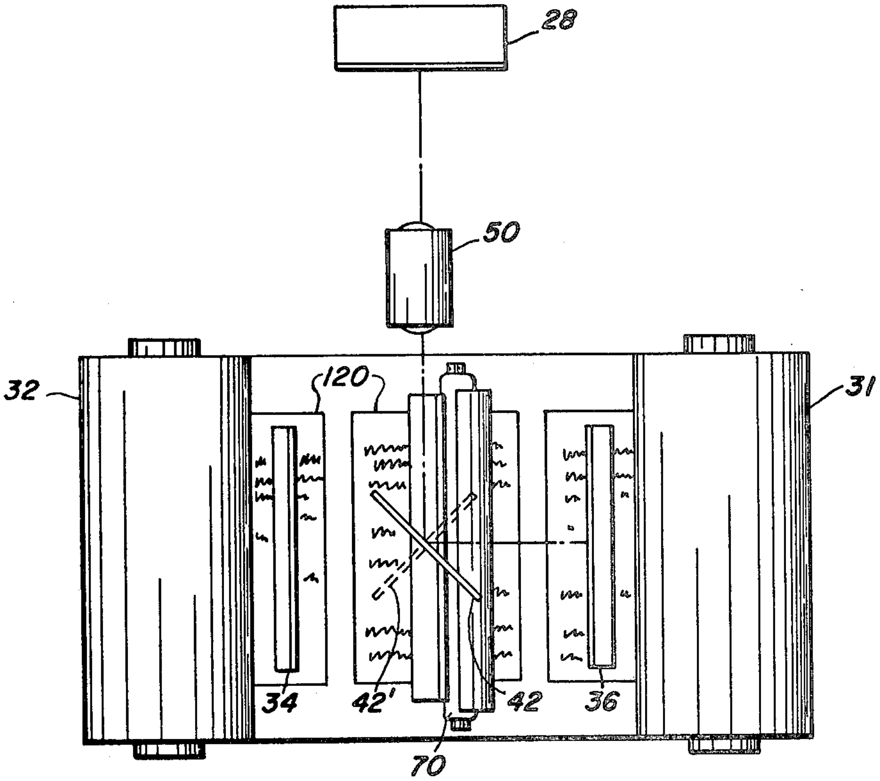
FIG. 3 is a top view taken along line 3—3 of FIG. 1.

Shingling means 205, as well as forwarding means 210 and transport means 64, are controlled by machine control means 101 with the transport means 64 and forwarding means 210 being actuated in response to the completion of a set of one-side copy sheets entering duplex tray means 200 to fast forward the set to refeeding means 300. It should be understood that more than one set of one-sided copies could be placed on transport means 64 at the same time if one desired. On succeeding passes on the automatic document handler, forward and reverse, all documents are imaged with copy substrates being fed from the copy sheet tray 90 to transfer station D alternately with copy sheets fed from refeeding means 300. Copy sheets fed from primary copy sheet tray 90 receive images of even positioned documents in the ADH and are fed to buffer tray means 200 while copy sheets that are fed from refeeding means 300 alternate with the sheets fed from the primary copy sheet tray and received images on the reverse side thereof of odd positioned documents in the ADH and are fed to output station 151 for copy sets made on the forward pass, or station 152 for copy sets made on the reverse pass, so that once a completed, collated set of documents have been collected in the output station, they may be stapled and side stacked or staggered and they will still read in consecutive ascending order, for instance, 1, 2, 3, 4, 5, 6 etc . . . . On the last pass of web 33 past the exposure station 70, only odd numbered or positioned documents 120 are imaged as shown in FIG. 3. The images are then copied on the back of copies previously made from even numbered documents that are fed by refeeding means 300. This process empties the refeeding means and presents the final set of duplexed copies to the output station. However, if a two-set buffer is used, i.e., if the ADH imaged documents on both the forward and reverse scans, odd numbered documents (only) are imaged on both of the final forward and reverse scans of web 33 in order to make complete duplexed copies of the two sets of evens located adjacent to each other on transport means 64 adapted for refeeding by means 300 in order to finish the duplex run of collated sets with an empty transport means 64 and refeeding means 300.

It should be understood that odd numbered documents could be imaged on the first pass of the ADH, however, to do so would require an extra pass of the last copy sheet through the transfer station without putting an image on the even side thereof in the copying of an odd numbered document set, e.g. a set of 5 documents. Various other ways of using the machine disclosed in use with the present invention are disclosed in U.S. application Ser. No. 767,012, filed Feb. 9, 1977 now Pat. No. 4,116,958, by John A. Adamack and Richard T. Ziehm, which disclosure is incorporated herein by reference as is necessary for implementation of the present invention.

In reference to FIG. 2, an optical system for scanning documents in both directions of relative reciprocal motion between the documents and the optical system is shown. The document is first scanned in one direction, then the image orientation if rotated 180° about the axis of propagation for scanning in the reverse direction. Properly oriented images are thus projected onto photoreceptor 20 and move in the same direction during both directions of scan, i.e. moving in the same direction as the photoreceptor surface in both cases without reversing the photoreceptor movement. This is more fully disclosed in U.S. patent application Ser. No. 552,003, filed Feb. 24, 1975 now U.S. Pat. No. 4,116,558.

A programmable machine controller 101 is used to control the operation of xerographic reproduction in either the simplex or duplex modes of copier 10, such as, the controller disclosed in U.S. Pat. No. 3,940,210, which is incorporated herein by reference.

Referring now to the particular advantages of the present invention, one can see that the duplex return transport is used as the sheet collecting vehicle by shingle collecting the sheets on the transport and feeding them out through the use of a set of pinch rolls, nudger rolls, appropriate gates and holding mechanisms. The advantages gained by the use of this system over previous systems include more positive control of single sheets and sets, and thereby improved reliability, as well as obtaining a much lower cost basis by eliminating stack separators, retard feeders, and servo systems. The present invention also improves productivity for small set lengths.

In conclusion, a duplex copying system is disclosed in which page images are formed onto both sides of copy sheets by copy processing means one side at a time to form multiple copy sheet sets. The duplex copying system of the present invention employs a buffer set means for temporarily storing a set of one-sided copies and subsequently forwarding the copies to a refeeding position for second-sided copying. The buffer tray means includes receiving means for receiving the one-sided sheets, as well as stacking means for stacking the one-sided sheets adjacent the receivng means. Forwarding means is located at the stacking means for forwarding the sheets out of the receiving means toward the refeeding means for second-sided copying. The forwarding means includes a means for indexing or shingling the sheets after they have entered the stacking means a predetermined amount in order to present a shingled set of copies to the refeeding means. Once a completed set is received in the buffer tray means, a machine controller triggers a transport means that forwards the complete set to the refeeding means at a much faster rate than the forwarding rate of the indexing or shingling means.

In addition to the method and apparatus disclosed above, other modifications and/or additions will readily appear to those skilled in the art upon reading this disclosure and are intended to be encompassed within the invention disclosed and claimed herein.

What is claimed is:

1. In a duplex copying system in which page images are formed onto both sides of copy sheets, by copy processor means one side at a time to form multiple copy sheet sets, the improvement comprising:

duplex buffer set means for temporarily storing a set of one-sided copies, said buffer set means comprising receiving means for receiving sheets with images on one side thereof from said copy processor means, stacking means for stacking said one-sided sheets at said receiving means, and forwarding means for forwarding said sheets out of said stacking means back to said copy processing means for images to be placed on the other side thereof, said forwarding means including shingling means for indexing each sheet out of the stacking means by a predetermined amount coordinated with the arrival of each incoming sheet in said receiving means to form a buffer set of one-sided sheets with each sheet in the set being offset from the other sheets by said predetermined amount.

2. The improvement of claim 1 including transport means for conveying said buffer set as a shingled unit to a sheet feeding means at a rate of speed faster than said shingling means.

3. The improvement of claim 2 wherein said transport means is actuated in response to the completion of a set of one-sided copy sheets.

4. The improvement of claim 2 wherein said receiving means is positioned on one side of said processor means and said sheet feeding means is located on the other side of said processor means.

5. The improvement of claim 4 wherein said buffer sets are stored in an elongated path between the two sides of said processor means.

6. The improvement of claim 1 wherein said predetermined amount of offset in a shingled set is about ½ inch.

7. A reproduction system for producing duplexed copies from page images, comprising in combination:

a. printing means to print said page images on one side of copy sheets;

b. means for supplying copy sheets to said printing means to receive said page images; and c. buffer means for receiving said copy sheets having images on one side thereof, said buffer means including shingling means for indexing the copy sheets a predetermined amount after each copy sheet enters said buffer to form a shingled set of copy sheets, said indexing occurring prior to any action to feed the sheets out of the buffer means.

* * * * *